(12) United States Patent
Kim et al.

(10) Patent No.: US 11,640,810 B2
(45) Date of Patent: May 2, 2023

(54) DISPLAY APPARATUS AND METHOD OF DRIVING THE SAME

(71) Applicant: Samsung Display Co., Ltd., Yongin-Si (KR)

(72) Inventors: Ji Hye Kim, Hwaseong-si (KR); Young Ha Sohn, Seongnam-si (KR); Jin-Wook Yang, Suwon-si (KR); Dong Gyu Lee, Suwon-si (KR); Jae-Hyeon Jeon, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/142,585

(22) Filed: Jan. 6, 2021

(65) Prior Publication Data
US 2021/0287630 A1 Sep. 16, 2021

(30) Foreign Application Priority Data

Mar. 12, 2020 (KR) .................. 10-2020-0030856

(51) Int. Cl.
| | |
|---|---|
| *H01L 27/32* | (2006.01) |
| *G09G 3/20* | (2006.01) |
| *G09G 5/14* | (2006.01) |
| *G09G 5/02* | (2006.01) |
| *H04N 5/225* | (2006.01) |
| *G06V 40/16* | (2022.01) |

(52) U.S. Cl.
CPC .............. *G09G 5/14* (2013.01); *G06V 40/166* (2022.01); *G09G 5/02* (2013.01); *H04N 5/2257* (2013.01); *G09G 2300/0452* (2013.01); *G09G 2320/0233* (2013.01)

(58) Field of Classification Search
CPC ......... H01L 27/32; H01L 51/00; H01L 51/56; H01L 25/00; H01L 25/16; H01L 25/18; G09G 3/14; G09G 3/20; G09G 3/32; G09G 3/3225; G09G 3/3208; G09G 3/3275; G09G 5/00; G09G 5/02; G09G 2300/0452; G09G 2320/0233; G06V 40/166; H04N 5/2257
See application file for complete search history.

(56) References Cited

U.S. PATENT DOCUMENTS

| | | | |
|---|---|---|---|
| 2015/0288681 A1* | 10/2015 | Park ...................... | H04W 12/06 726/6 |
| 2017/0069290 A1* | 3/2017 | Lee ....................... | G09G 3/2044 |
| 2018/0005563 A1* | 1/2018 | Lee ........................ | G09G 3/003 |
| 2020/0212147 A1* | 7/2020 | Han ...................... | H01L 51/5253 |

(Continued)

FOREIGN PATENT DOCUMENTS

KR 1020200109435 A 9/2020

*Primary Examiner* — Chanh D Nguyen
*Assistant Examiner* — Nguyen H Truong
(74) *Attorney, Agent, or Firm* — Cantor Colburn LLP

(57) ABSTRACT

A display apparatus includes an optical module, a display panel and a display panel driver. The display panel is disposed on the optical module. The display panel driver is configured to drive the display panel. The display panel includes a first display area including at least a portion overlapping with the optical module and a second display area not overlapping with the optical module in a plan view. The first display area includes pixels having a first pixel structure. The second display area includes pixels having a second pixel structure different from the first pixel structure.

21 Claims, 9 Drawing Sheets

(56) References Cited

U.S. PATENT DOCUMENTS

| | | | | |
|---|---|---|---|---|
| 2020/0279517 A1* | 9/2020 | Huang | .................... | H01L 27/32 |
| 2020/0411607 A1* | 12/2020 | Jian | ..................... | H01L 27/3218 |
| 2021/0064087 A1* | 3/2021 | Ma | ........................ | G06F 1/1637 |
| 2021/0065625 A1* | 3/2021 | Wang | ................... | G09G 3/2003 |
| 2021/0217821 A1* | 7/2021 | Han | .................... | H01L 27/3234 |

* cited by examiner

DISPLAY APPARATUS AND METHOD OF DRIVING THE SAME

This application claims priority to Korean Patent Application No. 10-2020-0030856, filed on Mar. 12, 2020, and all the benefits accruing therefrom under 35 U.S.C. § 119, the content of which in its entirety is herein incorporated by reference.

BACKGROUND

1. Field

Embodiments of the present inventive concept relate to a display apparatus and a method of driving the display apparatus. More particularly, embodiments of the present inventive concept relate to a display apparatus including an optical module and a method of driving the display apparatus.

2. Description of the Related Art

Generally, a display apparatus includes a display panel and a display panel driver. The display panel includes a plurality of gate lines, a plurality of data lines, a plurality of emission lines and a plurality of pixels. The display panel driver includes a gate driver, a data driver, an emission driver and a driving controller. The gate driver outputs gate signals to the gate lines. The data driver outputs data voltages to the data lines. The emission driver outputs emission signals to the emission lines. The driving controller controls the gate driver, the data driver and the emission driver.

The display apparatus may further include sensors to sense a position of a user, an appearance of the user and so on to operate an additional function. When a sensor substrate including the sensors is disposed under the display panel, a transmission area may be formed in the display panel for the sensors to sense the user such that the luminance ununiformity of the image on the display panel may be generated due to the transmission area.

SUMMARY embodiments of the present inventive concept provide a display apparatus including a pixel in a first display area including at least a portion overlapping with an optical module and a pixel in a second display area not overlapping with the optical module, and the pixel structure of the pixel in the first display area is different from the pixel structure of the pixel in the second display area.

Embodiments of the present inventive concept also provide a method of driving the display apparatus.

In an embodiment of a display apparatus according to the present inventive concept, the display apparatus includes an optical module, a display panel and a display panel driver. The display panel is disposed on the optical module. The display panel driver is configured to drive the display panel. The display panel includes a first display area including at least a portion overlapping with the optical module and a second display area not overlapping with the optical module in a plan view. The first display area includes pixels having a first pixel structure. The second display area includes pixels having a second pixel structure different from the first pixel structure.

In an embodiment, the pixel having the second pixel structure may include a first subpixel of a first color, a second subpixel of a second color, a third subpixel of a third color and a fourth subpixel of the second color.

In an embodiment, each of an emission area of the first subpixel, an emission area of the second subpixel, an emission area of the third subpixel and an emission area of the fourth subpixel of the pixel having the second pixel structure may have a rhombus shape.

In an embodiment, each of the emission area of the first subpixel and the emission area of the third subpixel of the pixel having the second pixel structure may be greater than each of the emission area of the second subpixel and the emission area of the fourth subpixel of the pixel having the second pixel structure.

In an embodiment, the pixel having the first pixel structure may include a first subpixel of the first color, a second subpixel of the second color and a third subpixel of the third color.

In an embodiment, each of an emission area of the first subpixel, an emission area of the second subpixel, an emission area of the third subpixel and an emission area of the fourth subpixel of the pixel having the second pixel structure may have a rhombus shape. Each of an emission area of the first subpixel, an emission area of the second subpixel and an emission area of the third subpixel of the pixel having the first pixel structure may have a rectangular shape.

In an embodiment, a ratio between a total size of pixel areas in a unit area of the first pixel structure and a size of the unit area of the first pixel structure may be about 2:9.

In an embodiment, the first subpixel of the first pixel structure and the first subpixel of the second pixel structure may be connected to the same data line. The second subpixel of the first pixel structure and the second subpixel of the second pixel structure may be connected to the same data line. The third subpixel of the first pixel structure and the third subpixel of the second pixel structure may be connected to the same data line.

In an embodiment, first to fourth subpixels of a first pixel having the second pixel structure may be connected to first to fourth data lines, respectively, first to fourth subpixels of a second pixel having the second pixel structure disposed adjacent to the first pixel having the second pixel structure may be connected to fifth to eighth data lines, respectively, and first to fourth subpixels of a third pixel having the second pixel structure and disposed adjacent to the second pixel having the second pixel structure may be connected to ninth to twelfth data lines, respectively. First to third subpixels of a first pixel having the first pixel structure may be connected to the first to third data lines, respectively, and first to third subpixels of a second pixel having the first pixel structure and disposed adjacent to the first pixel having the first pixel structure may be connected to the nine to eleventh data lines, respectively.

In an embodiment, first to fourth subpixels of a first pixel having the second pixel structure may be connected to first to fourth data lines, respectively, first to fourth subpixels of a second pixel having the second pixel structure and disposed adjacent to the first pixel having the second pixel structure may be connected to fifth to eighth data lines, respectively, and first to fourth subpixels of a third pixel having the second pixel structure and disposed adjacent to the second pixel having the second pixel structure may be connected to ninth to twelfth data lines, respectively. First to third subpixels of a first pixel having the first pixel structure may be connected to the first to third data lines, respectively, and first to third subpixels of a second pixel having the first pixel structure and disposed adjacent to the first pixel having the first pixel structure may be connected to the fifth to seventh data lines, respectively.

In an embodiment, when input image data comprise a first color first data, a second color first data, a third color first data, a first color second data, a second color second data and a third color second data, the display panel driver may be configured to apply a data voltage corresponding to an average value of the first color first data and the first color second data to the first subpixel of the pixel having the second pixel structure, a data voltage corresponding to a value of the second color first data to the second subpixel of the pixel having the second pixel structure, a data voltage corresponding to an average value of the third color first data and the third color second data to the third subpixel of the pixel having the second pixel structure and a data voltage corresponding to a value of the second color second data to the fourth subpixel of the pixel having the second pixel structure.

In an embodiment, when the input image data comprise a first color third data, a second color third data, a third color third data, a first color fourth data, a second color fourth data and a third color fourth data, the display panel driver may be configured to apply a data voltage corresponding to an average value of the first color third data X3 and the first color fourth data X4 to the first subpixel of the pixel having the first pixel structure, a data voltage corresponding to a value of the second color third data to the second subpixel of the pixel having the first pixel structure and a data voltage corresponding to an average value of the third color third data and the third color fourth data to the third subpixel of the pixel having the first pixel structure.

In an embodiment, the optical module may be a camera module.

In an embodiment, the camera module may be disposed at a first end portion of an optical module substrate. The camera module may have a circular shape. The first display area may be disposed at a first end portion of the display panel corresponding to the first end portion of the optical module substrate. The first display area may cover the camera module in the plan view. The first display area may have a rectangular shape.

In an embodiment, the camera module may be disposed at a first end portion of an optical module substrate. The camera module may have a circular shape. The first display area may be disposed at a first end portion of the display panel corresponding to the first end portion of the optical module substrate. The first display area may cover the camera module in the plan view. The first display area may have a circular shape.

In an embodiment, the optical module may include a face recognition sensor module. The face recognition sensor module may include a plurality of face recognition sensors disposed at a first end portion of an optical module substrate. The face recognition sensor may have a circular shape. The first display area of the display panel may be disposed at a first end portion of the display panel corresponding to the first end portion of the optical module substrate. The first display area of the display panel may cover the plurality of the face recognition sensors in the plan view. The first display area may have a rectangular shape.

In an embodiment of a method of driving a display apparatus, the method includes driving a first display area including at least a portion overlapping with an optical module in a plan view, where the first display area includes pixels having a first pixel structure; and driving a second display area not overlapping with the optical module in the plan view, where the second display area includes pixels having a second pixel structure different from the first pixel structure. The pixel having the second pixel structure includes a first subpixel of a first color, a second subpixel of a second color, a third subpixel of a third color and a fourth subpixel of the second color. The pixel having the first pixel structure includes a first subpixel of the first color, a second subpixel of the second color and a third subpixel of the third color.

In an embodiment, first to fourth subpixels of a first pixel having the second pixel structure may be connected to first to fourth data lines, respectively, first to fourth subpixels of a second pixel having the second pixel structure and disposed adjacent to the first pixel having the second pixel structure may be connected to fifth to eighth data lines, respectively, and first to fourth subpixels of a third pixel having the second pixel structure and disposed adjacent to the second pixel having the second pixel structure may be connected to ninth to twelfth data lines, respectively. First to third subpixels of a first pixel having the first pixel structure may be connected to the first to third data lines, respectively, and first to third subpixels of a second pixel having the first pixel structure and disposed adjacent to the first pixel having the first pixel structure may be connected to the nine to eleventh data lines, respectively.

In an embodiment, first to fourth subpixels of a first pixel having the second pixel structure may be connected to first to fourth data lines, respectively, first to fourth subpixels of a second pixel having the second pixel structure and disposed adjacent to the first pixel having the second pixel structure may be connected to fifth to eighth data lines, respectively, and first to fourth subpixels of a third pixel having the second pixel structure and disposed adjacent to the second pixel having the second pixel structure may be connected to ninth to twelfth data lines, respectively. First to third subpixels of a first pixel having the first pixel structure may be connected to the first to third data lines, respectively, and first to third subpixels of a second pixel having the first pixel structure and disposed adjacent to the first pixel having the first pixel structure may be connected to the fifth to seventh data lines, respectively.

In an embodiment, when input image data comprise a first color first data, a second color first data, a third color first data, a first color second data, a second color second data and a third color second data, a display panel driver may be configured to apply a data voltage corresponding to an average value of the first color first data and the first color second data to the first subpixel of the pixel having the second pixel structure, a data voltage corresponding to a value of the second color first data to the second subpixel of the pixel having the second pixel structure, a data voltage corresponding to an average value of the third color first data and the third color second data to the third subpixel of the pixel having the second pixel structure and a data voltage corresponding to a value of the second color second data to the fourth subpixel of the pixel having the second pixel structure.

In an embodiment, when the input image data comprise a first color third data, a second color third data, a third color third data, a first color fourth data, a second color fourth data and a third color fourth data, the display panel driver may be configured to apply a data voltage corresponding to an average value of the first color third data and the first color fourth data to the first subpixel of the pixel having the first pixel structure, a data voltage corresponding to a value of the second color third data to the second subpixel of the pixel having the first pixel structure and a data voltage corresponding to an average value of the third color third data and the third color fourth data to the third subpixel of the pixel having the first pixel structure.

According to the display apparatus and the method of driving the display apparatus, the pixel structure of the pixel in the first display area including at least a portion overlapping with the optical module is different from the pixel structure of the pixel in the second display area not overlapping with the optical module such that the display quality of the display panel may be enhanced. In addition, first to third subpixels of one pixel of the first display area may be connected to first to third subpixels of one pixel of the second display area, respectively, such that a data distortion and a data mixing may be prevented in the first display area.

BRIEF DESCRIPTION OF THE DRAWINGS

The above and other features and advantages of the present inventive concept will become more apparent by describing in detailed embodiments thereof with reference to the accompanying drawings, in which.

DETAILED DESCRIPTION

Hereinafter, the present inventive concept will be explained in detail with reference to the accompanying drawings. It will be understood that when an element is referred to as being "on" another element, it can be directly on the other element or intervening elements may be present therebetween. In contrast, when an element is referred to as being "directly on" another element, there are no intervening elements present. It will be understood that, although the terms "first," "second," "third" etc. may be used herein to describe various elements, components, regions, layers and/ or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein. The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/ or "including" when used in this specification, specify the presence of stated features, regions, integers, steps, operations, elements, and/or components, but do not preclude the presence or addition of one or more other features, regions, integers, steps, operations, elements, components, and/or groups thereof.

Figure 1:
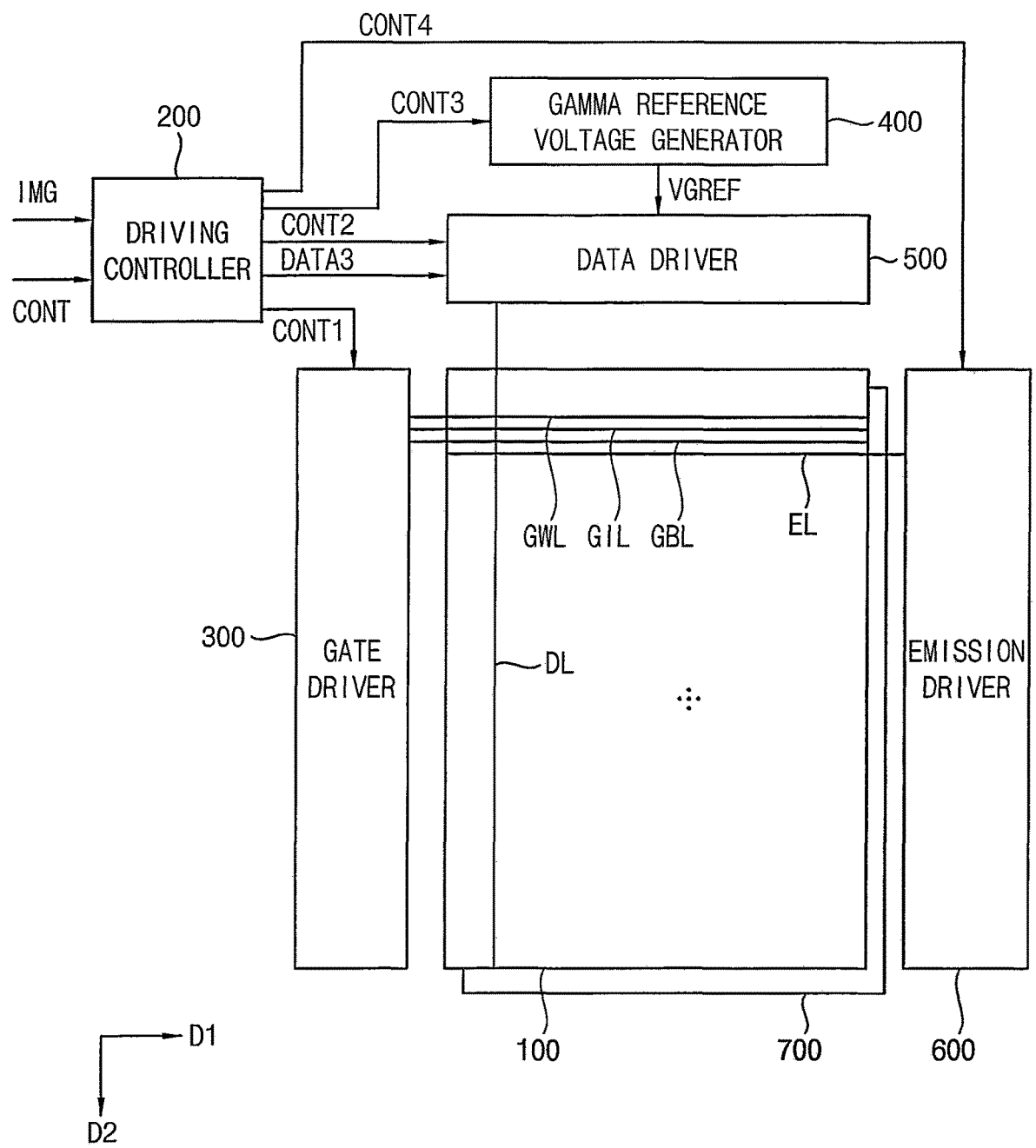
FIG. 1 is a block diagram illustrating a display apparatus according to an embodiment of the present inventive concept.

FIG. 1 is a block diagram illustrating a display apparatus according to an embodiment of the present inventive concept.

Referring to FIG. 1, the display apparatus includes a display panel 100 and a display panel driver. The display panel driver includes a driving controller 200, a gate driver 300, a gamma reference voltage generator 400, a data driver 500 and an emission driver 600. The display apparatus may further include an optical module substrate 700.

For example, the driving controller 200 and the data driver 500 may be integrally formed. For example, the driving controller 200, the gamma reference voltage generator 400 and the data driver 500 may be integrally formed. For example, the driving controller 200, the gate driver 300, the gamma reference voltage generator 400 and the data driver 500 may be integrally formed. For example, the driving controller 200, the gate driver 300, the gamma reference voltage generator 400, the data driver 500 and the emission driver 600 may be integrally formed.

The display panel 100 includes a plurality of gate lines GWL, GIL and GBL, a plurality of data lines DL, a plurality of emission lines EL and a plurality of pixels electrically connected to the gate lines GWL, GIL and GBL, the data lines DL and the emission lines EL. The gate lines GWL, GIL and GBL extend in a first direction D1, the data lines DL extend in a second direction D2 crossing the first direction D1 and the emission lines EL extend in the first direction D1.

The driving controller 200 receives input image data IMG and an input control signal CONT from an external apparatus. For example, the input image data IMG may include red image data, green image data and blue image data. The input image data IMG may include white image data. In another embodiment, the input image data IMG may include magenta image data, cyan image data and yellow image data. The input control signal CONT may include a master clock signal and a data enable signal. The input control signal CONT may further include a vertical synchronizing signal and a horizontal synchronizing signal.

The driving controller 200 generates a first control signal CONT1, a second control signal CONT2, a third control signal CONT3, a fourth control signal CONT4 and a data signal DATA based on the input image data IMG and the input control signal CONT.

The driving controller 200 generates the first control signal CONT1 for controlling an operation of the gate driver 300 based on the input control signal CONT, and outputs the first control signal CONT1 to the gate driver 300. The first control signal CONT1 may include a vertical start signal and a gate clock signal.

The driving controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the third control signal CONT3 for controlling an operation of the gamma reference voltage generator 400 based on the input control signal CONT, and outputs the third control signal CONT3 to the gamma reference voltage generator 400.

The driving controller 200 generates the fourth control signal CONT4 for controlling an operation of the emission driver 600 based on the input control signal CONT, and outputs the fourth control signal CONT4 to the emission driver 600.

The gate driver 300 generates gate signals driving the gate lines GWL, GIL and GBL in response to the first control signal CONT1 received from the driving controller 200. The gate driver 300 may output the gate signals to the gate lines GWL, GIL and GBL. For example, the gate driver 300 may be integrated on the display panel 100. For another example, the gate driver 300 may be mounted on the display panel 100.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF has a value corresponding to a level of the data signal DATA.

In an embodiment, the gamma reference voltage generator 400 may be disposed in the driving controller 200, or in the data driver 500.

The data driver 500 receives the second control signal CONT2 and the data signal DATA from the driving controller 200, and receives the gamma reference voltages VGREF from the gamma reference voltage generator 400. The data driver 500 converts the data signal DATA into data voltages having an analog type using the gamma reference voltages VGREF. The data driver 500 outputs the data voltages to the data lines DL.

The emission driver 600 generates emission signals to drive the emission lines EL in response to the fourth control signal CONT4 received from the driving controller 200. The emission driver 600 may output the emission signals to the emission lines EL. For example, the emission driver 600 may be integrated on the display panel 100. For another example, the emission driver 600 may be mounted on the display panel 100. Although FIG. 1 illustrates that the gate driver 300 is disposed in a first side of the pixels of the display panel 100 and applies the gate signal to the pixels and the emission driver 600 is disposed in a second side of the pixels of the display panel 100 and applies the emission signal to the pixels for convenience of explanation, the present inventive concept is not limited thereto. Alternatively, the gate driver 300 and the emission driver 600 may be disposed in the first side of the pixels of the display panel 100 and apply the gate signal and the emission signal to the pixels. Alternatively, the gate drivers 300 and the emission drivers 600 may be disposed in both sides of the pixels of the display panel 100 and apply the gate signal and the emission signal to the pixels.

The optical module substrate 700 may be disposed under the display panel 100. The optical module substrate 700 may include an optical module such as a camera module, a sensor module and so on.

Figure 2:
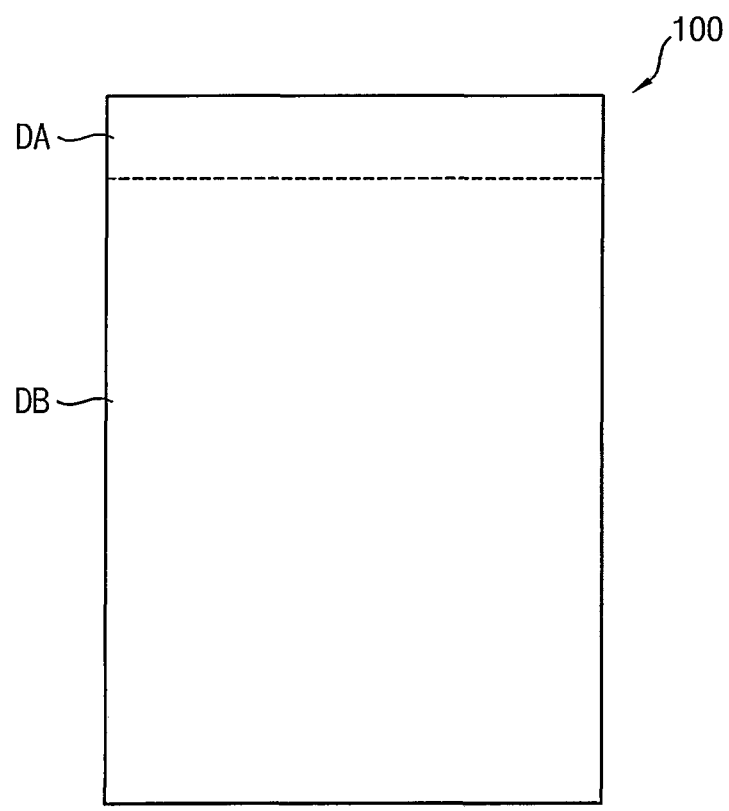
FIG. 2 is a conceptual diagram illustrating a display panel of FIG. 1.
Figure 3:
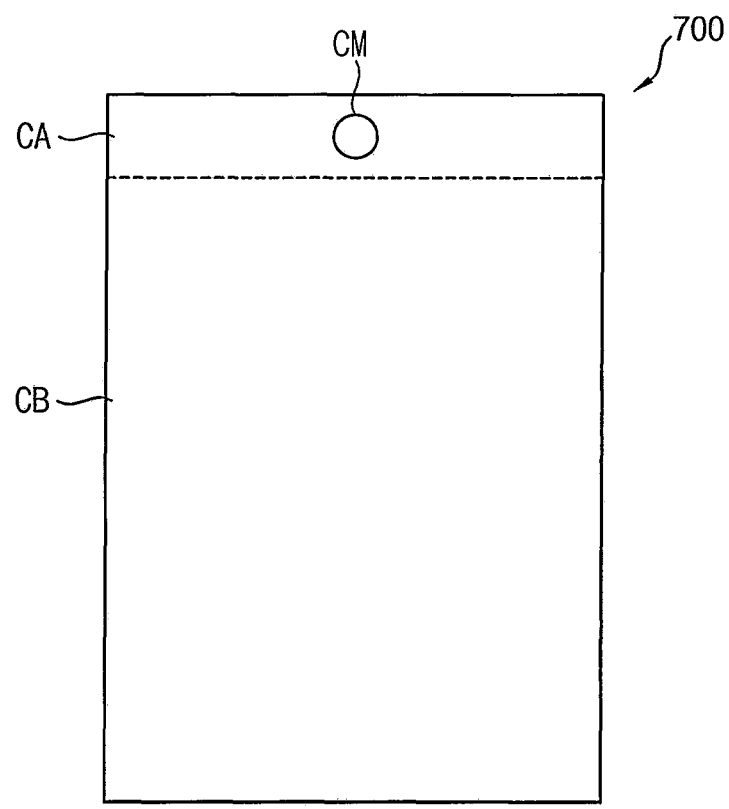
FIG. 3 is a conceptual diagram illustrating an optical module of FIG. 1.

FIG. 2 is a conceptual diagram illustrating the display panel 100 of FIG. 1. FIG. 3 is a conceptual diagram illustrating the optical module substrate 700 of FIG. 1. FIGS. 2 and 3 are plan views.

Referring to FIGS. 1 to 3, the display panel 100 may include a first display area DA and a second display area DB. The optical module substrate 700 may include a first area CA and a second area CB.

The optical module substrate 700 may include an optical module CM. In the present embodiment, the optical module CM may be a camera module CM. The camera module CM may be disposed at a first end portion of the optical module substrate 700. The camera module CM may have a circular shape. The camera module CM may be disposed in the first area CA of the optical module substrate 700. The camera module CM may not be disposed in the second area CB of the optical module substrate 700. Although a size of the optical module substrate 700 is similar to a size of the display panel 100 in FIG. 3, the present inventive concept is not limited thereto. Alternatively, the optical module substrate 700 may be smaller than the display panel 100 such that the optical module substrate 700 may overlap with only the first display area DA of the display panel 100 in the plan view.

The first display area DA of the display panel 100 may correspond to the first area CA of the optical module substrate 700. For example, the first display area DA of the display panel 100 may overlap with the first area CA of the optical module substrate 700.

The first display area DA may be disposed at a first end portion of the display panel 100 corresponding to the first end portion of the optical module substrate 700. The first display area DA may cover the camera module CM. The first display area DA may have a rectangular shape.

The second display area DB of the display panel 100 may correspond to the second area CB of the optical module substrate 700. For example, the second display area DB of the display panel 100 may overlap with the second area CB of the optical module substrate 700. The second display area DB may not overlap with the camera module CM.

Figure 4:
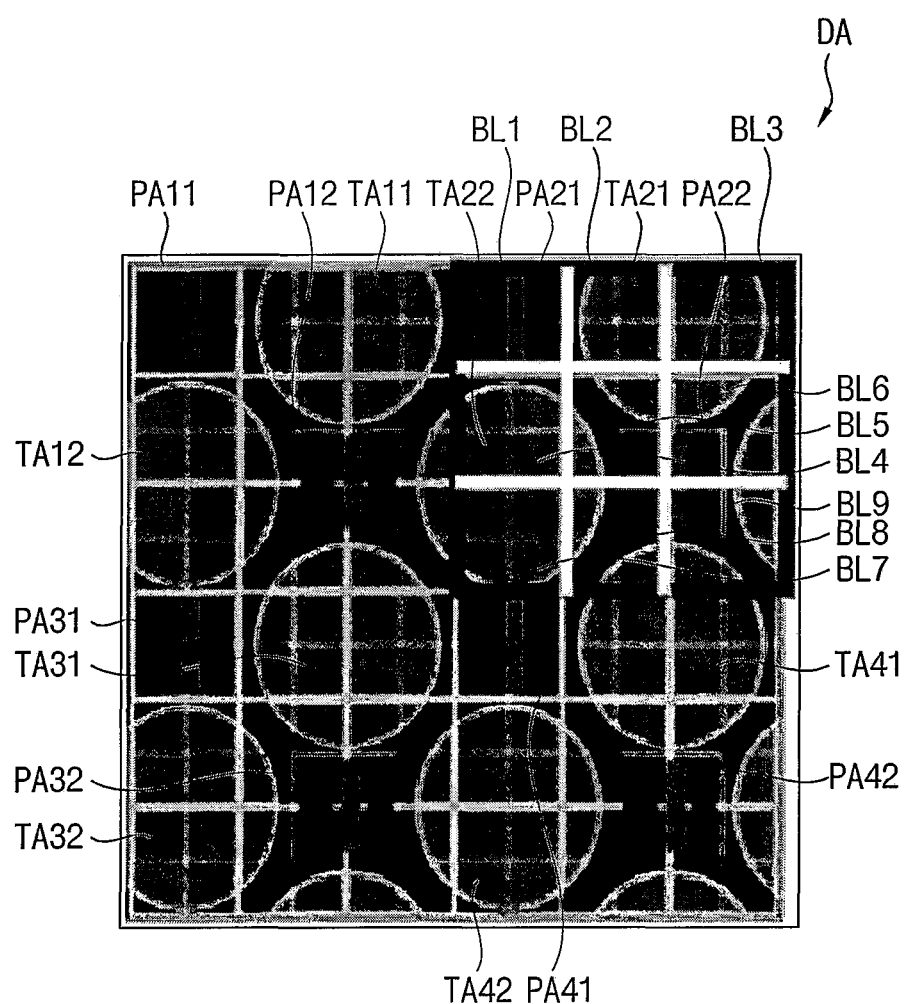
FIG. 4 is a plan view illustrating a structure of a first display area of FIG. 2.
Figure 5:
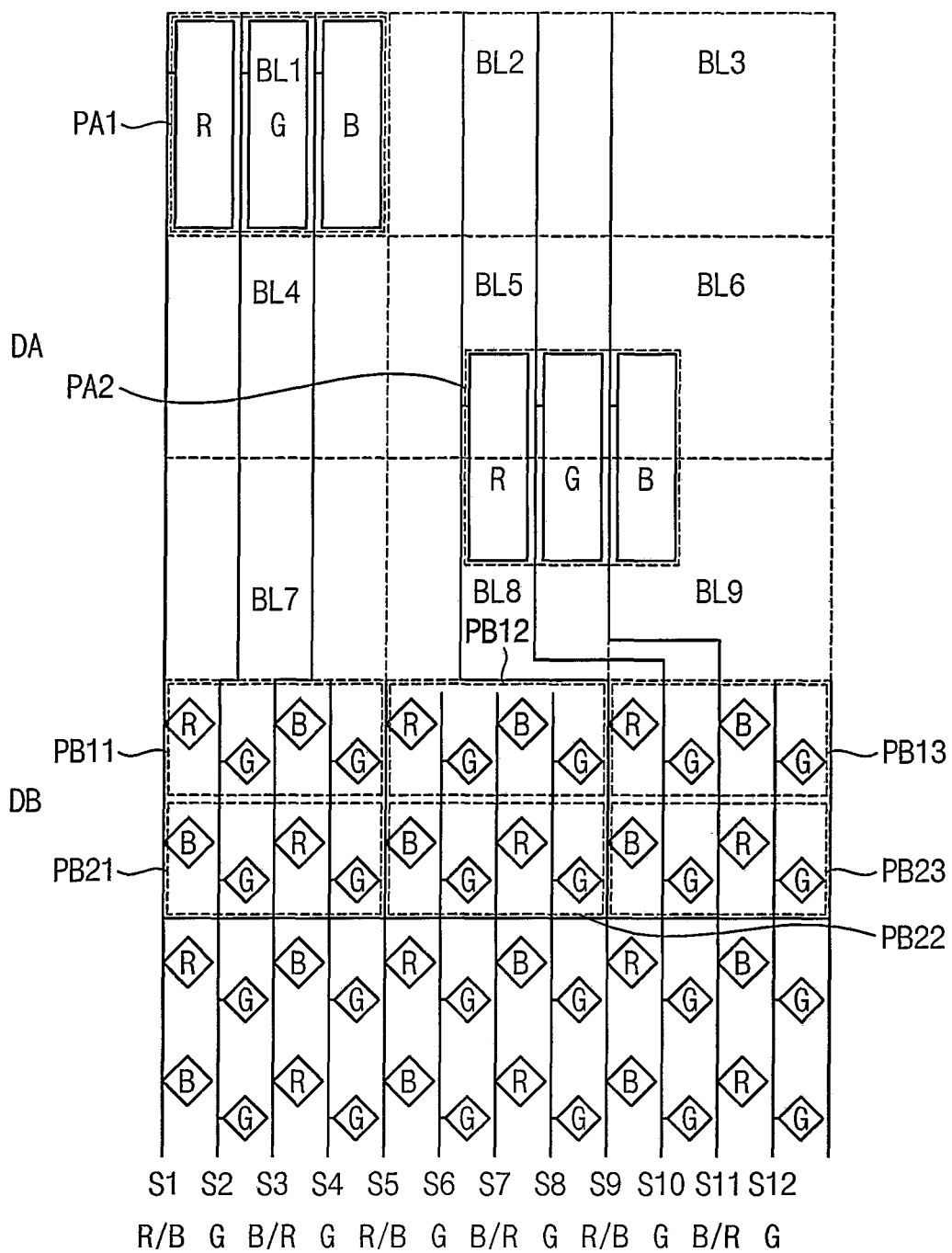
FIG. 5 is a conceptual diagram illustrating a pixel structure of a first display area of FIG. 2 and a pixel structure of a second display area of FIG. 2.

FIG. 4 is a plan view illustrating a structure of the first display area DA of FIG. 2. FIG. 5 is a conceptual diagram illustrating a pixel structure of the first display area DA of FIG. 2 and a pixel structure of the second display area DB of FIG. 2.

Referring to FIGS. 1 to 5, the display panel 100 includes the first display area DA including at least a portion overlapping with the optical module CM and the second display area DB not overlapping with the optical module CM. The first display area DA includes pixels having a first pixel structure. The second display area DB includes pixels having a second pixel structure.

As shown in FIG. 4, the first display area DA may include a plurality of pixel areas PA11, PA12, PA21, PA22, PA31, PA32, PA41 and PA42 and a plurality of transmitting areas TA11, TA12, TA21, TA22, TA31, TA32, TA41 and TA42.

Each of the pixel areas PA11, PA12, PA21, PA22, PA31, PA32, PA41 and PA42 may include a plurality of subpixels. For example, each of the pixel areas PA11, PA12, PA21, PA22, PA31, PA32, PA41 and PA42 may have a rectangular shape.

The transmitting areas TA11, TA12, TA21, TA22, TA31, TA32, TA41 and TA42 may include a plurality of transmitting windows. The transmitting window may have a circular shape.

The first display area DA may include a light blocking area which does not overlap with the pixel areas PA11, PA12, PA21, PA22, PA31, PA32, PA41 and PA42 and the transmitting areas TA11, TA12, TA21, TA22, TA31, TA32, TA41 and TA42.

A unit area of the first display area DA may include nine blocks BL1, BL2, BL3, BL4, BL5, BL6, BL7, BL8 and BL9, for example, forming a three by three matrix. For example, two pixels (e.g., PA21 and PA22) are disposed in the unit area. For example, a size of the block may be same as a size of the pixel. For example, a ratio between a total size of the pixel areas in the unit area and a size of the unit area may be about 2:9.

In an embodiment, for example, a first pixel (e.g., PA21) in the unit area may be disposed in the first block BL1. For example, a second pixel (e.g., PA22) in the unit area may overlap with a portion of the fifth block BL5, a portion of the sixth block BL6, a portion of the eighth block BL8 and a portion of the ninth block BL9.

As shown in FIG. 5, each of the pixels PB11, PB12, PB13, PB21, PB22 and PB23 having the second pixel structure in the second display area DB may include four subpixels. Each of the pixels PB11, PB12, PB13, PB21, PB22 and PB23 having the second pixel structure may include a first subpixel of a first color R, a second subpixel of a second color G, a third subpixel of a third color B and a fourth subpixel of the second color G.

In an embodiment, for example, the first color may be red, the second color may be green and the third color may be blue.

In an embodiment, for example, an emission area of the first subpixel, an emission area of the second subpixel, an emission area of the third subpixel and an emission area of the fourth subpixel of the pixel (e.g. PB11, PB12, PB13, PB21, PB22 and PB23) having the second pixel structure may have a rhombus shape.

In addition, the emission area of the first subpixel (e.g., subpixel emitting the first color R) and the emission area of the third subpixel (e.g., subpixel emitting the third color B) of the pixel (e.g. PB11, PB12, PB13, PB21, PB22 and PB23) having the second pixel structure may be greater than the emission area of the second subpixel and the emission area of the fourth subpixel (e.g., subpixel emitting the second color G) of the pixel (e.g. PB11, PB12, PB13, PB21, PB22 and PB23) having the second pixel structure.

In an embodiment, for example, each of pixels PB11, PB12 and PB13 in a first row of the second pixel structure may include a first subpixel of the first color R, a second subpixel of the second color G, a third subpixel of the third color B and a fourth subpixel of the second color G. Each of pixels PB21, PB22 and PB23 in a second row of the second pixel structure may include a first subpixel of the third color B, a second subpixel of the second color G, a third subpixel of the first color R and a fourth subpixel of the second color G.

Similarly, each of pixels in a third row of the second pixel structure may include a first subpixel of the first color R, a second subpixel of the second color G, a third subpixel of the third color B and a fourth subpixel of the second color G. Each of pixels in a fourth row of the second pixel structure may include a first subpixel of the third color B, a second subpixel of the second color G, a third subpixel of the first color R and a fourth subpixel of the second color G.

The number of subpixels of each of the pixels PA1 and PA2 having the first pixel structure and disposed in the first display area DA may be different from the number of subpixels of each of the pixels PB11, PB12, PB13, PB21, PB22 and PB23 having the second pixel structure.

In an embodiment, for example, each of the pixels PA1 and PA2 having the first pixel structure may include three subpixels. Each of the pixels PA1 and PA2 having the first pixel structure may include a first subpixel of a first color R, a second subpixel of a second color G and a third subpixel of a third color B.

A shape of an emission area of the subpixel of the pixel PA1 and PA2 having the first pixel structure may be different from the shape of the emission area of the subpixel of the pixel (e.g. PB11, PB12, PB13, PB21, PB22 and PB23) having the second pixel structure.

In an embodiment, for example, each of the emission area of the first subpixel, the emission area of the second subpixel, the emission area of the third subpixel and the emission area of the fourth subpixel of the pixel (e.g. PB11, PB12, PB13, PB21, PB22 and PB23) having the second pixel structure may have a rhombus shape. For example, each of an emission area of the first subpixel, an emission area of the second subpixel and an emission area of the third subpixel of the pixel (e.g. PA1 and PA2) having the first pixel structure may have a rectangular shape.

As shown in FIG. 5, the size of the pixel (e.g. PA1 and PA2) having the first pixel structure may be greater than the size of the pixel (e.g. PB11, PB12, PB13, PB21, PB22 and PB23) having the second pixel structure. In an embodiment, the size of the pixel (e.g. PA1 and PA2) having the first pixel structure may be about twice the size of the pixel (e.g. PB11, PB12, PB13, PB21, PB22 and PB23) having the second pixel structure. One pixel (e.g. PA1) having the first pixel structure may be disposed in one block (e.g., BL1). Two pixels (e.g. PB11 and PB21) having the second pixel structure may be disposed in one block having the same size with the one block (e.g., BL1) in the first display area DA.

In addition, as shown in FIG. 5, in the second display area DB, the unit area includes nine blocks such that eighteen pixels (e.g. PB11, PB12, PB13, PB21, PB22 and PB23) having the second pixel structure may be disposed in the one unit area.

In contrast, in the first display area DA, the pixel area, the transmitting area and the light blocking area are disposed in the first pixel structure, such that two pixels (e.g. PA1 and PA2) having the first pixel structure may be disposed in the one unit area.

The first subpixel of the first pixel structure and the first subpixel of the second pixel structure may be connected to the same data line. The second subpixel of the first pixel structure and the second subpixel of the second pixel structure may be connected to the same data line. The third subpixel of the first pixel structure and the third subpixel of the second pixel structure may be connected to the same data line.

In an embodiment, for example, a first data line S1 may be connected to a first subpixel of a first pixel PA1 having the first pixel structure and a first subpixel of a first pixel PB11 having the second pixel structure. For example, a second data line S2 may be connected to a second subpixel of a first pixel PA1 having the first pixel structure and a second subpixel of a first pixel PB11 having the second pixel structure. For example, a third data line S3 may be connected to a third subpixel of a first pixel PA1 having the first pixel structure and a third subpixel of a first pixel PB11 having the second pixel structure.

In contrast, a fourth data line S4 may be connected to a fourth subpixel of the first pixel PB11 having the second pixel structure, but the fourth data line S4 may not be connected to any pixels having the first pixel structure in the first display area DA.

In the present embodiment, the first to fourth subpixels of the first pixel PB11 having the second pixel structure may be connected to the first to fourth data lines S1 to S4, respectively. First to fourth subpixels of a second pixel PB12 having the second pixel structure and disposed adjacent to the first pixel PB11 in the first direction D1 may be connected to fifth to eighth data lines S5 to S8, respectively. First to fourth subpixels of a third pixel PB13 having the second pixel structure and disposed adjacent to the second pixel PB12 in the first direction D1 may be connected to ninth to twelfth data lines S9 to S12, respectively. In this structure, the first to third subpixels of the first pixel PA1 having the first pixel structure may be connected to the first to third data lines S1 to S3, respectively. First to third subpixels of the second pixel PA2 having the first pixel structure and disposed adjacent to the first pixel PA1 in a diagonal direction between the first direction D1 and the second direction D2 may be connected to the nine to eleventh data lines S9 to S11, respectively.

Although not shown in figures, the connection structure of the first pixel structure, the second structure and the data line may be repetitive in a horizontal direction. For example, first to fourth subpixels of a fourth pixel having the second pixel structure and disposed adjacent to the third pixel PB13 in the first direction D1 may be connected to thirteenth to sixteenth data lines, respectively. First to fourth subpixels of a fifth pixel having the second pixel structure and disposed adjacent to the fourth pixel in the first direction D1 may be connected to seventeenth to twentieth data lines, respectively. First to fourth subpixels of a sixth pixel having the second pixel structure and disposed adjacent to the fifth pixel in the first direction D1 may be connected to twenty first to twenty fourth data lines, respectively. In this structure, the first to third subpixels of a third pixel having the first pixel structure and adjacent to the second pixel PA2 in a diagonal direction between the first direction D1 and the second direction D2 may be connected to the thirteenth to fifteenth data lines, respectively. First to third subpixels of a fourth pixel having the first pixel structure and disposed adjacent to the third pixel in a diagonal direction between the first direction D1 and the second direction D2 may be connected to the twenty first to twenty third data lines, respectively.

The first pixel PA1 in the first display area DA is connected to the first to third data lines S1 to S3 such that the first to third subpixels of the first pixel PA1 in the first display area DA are connected to the first to third subpixels of one pixel (e.g. PB11) in the second display area DB, respectively. Thus, the data distortion and the data mixing may be prevented in the first pixel PA1 in the first display area DA.

The second pixel PA2 in the first display area DA is connected to the ninth to eleventh data lines S9 to S11 such that the first to third subpixels of the second pixel PA2 in the first display area DA are connected to the first to third subpixels of one pixel (e.g. PB13) in the second display area DB, respectively. Thus, the data distortion and the data mixing may be prevented in the second pixel PA2 in the first display area DA.

Unlike the above, if the second pixel PA2 in the first display area DA is connected to the seventh to ninth data lines S7 to S9, the first to third subpixels of the second pixel PA2 in the first display area DA are connected to subpixels of two pixels (e.g. a third subpixel R and a fourth subpixel G of PB22 and a first subpixel B of PB23) in the second display area DB, respectively. Thus, the second pixel PA2 in the first display area DA displays an image using partial data of two pixels (e.g. PB22 and PB23) such that the data distortion and the data mixing may be generated in the second pixel PA2 in the first display area DA. Therefore, a display defect may be generated at the first display area DA.

Figure 6:
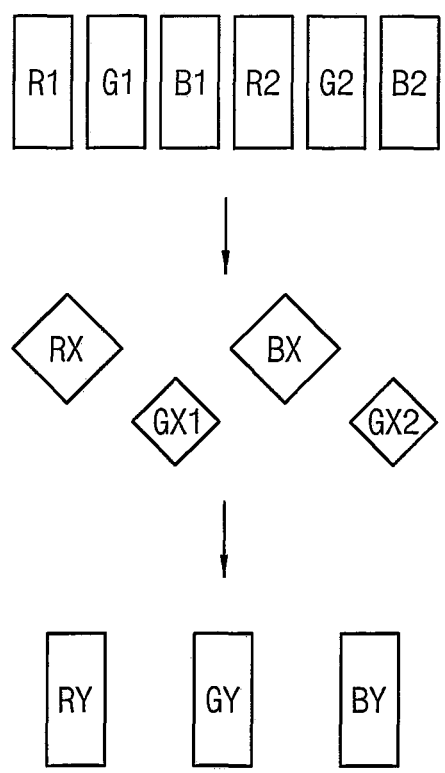
FIG. 6 is a conceptual diagram illustrating a data voltage applied to a pixel in the first display area of FIG. 2 and a data voltage applied to a pixel in the second display area of FIG. 2.

FIG. 6 is a conceptual diagram illustrating a data voltage applied to a pixel in the first display area DA of FIG. 2 and a data voltage applied to a pixel in the second display area DB of FIG. 2.

Referring to FIGS. 1 to 6, the pixels in the second display area DB include four subpixels (e.g. RGBG) having the first color, the second color, the third color and the second color, respectively. However, the input image data IMG may include data (e.g. RGB) representing the first color, the second and the third color, respectively. To display the input image data IMG on the pixels of the display panel 100, the data may need to be converted.

When the input image data IMG include a first color first data R1, a second color first data G1, a third color first data B1, a first color second data R2, a second color second data G2 and a third color second data B2, the display panel driver (e.g. the driving controller 200) may apply the data voltage corresponding to (R1+R2)/2 (i.e., average value of the first color first data R1 and the first color second data R2) to the first subpixel RX of the pixel having the second pixel structure, the data voltage corresponding to G1 (i.e., value of the second color first data G1) to the second subpixel GX1 of the pixel having the second pixel structure, the data voltage corresponding to (B1+B2)/2 (i.e., average value of third color first data B1 and the third color second data B2) to the third subpixel BX of the pixel having the second pixel structure, and the data voltage corresponding to G2 (i.e., value of the second color second data G2) to the fourth subpixel GX2 of the pixel having the second pixel structure.

Although the pixels in the first display area DA includes the first color subpixel, the second color subpixel and the third color subpixel (e.g. RGB), the pixels in the first display area DA may be connected to the pixels in the second display area DB through the same data lines.

Thus, when the input image data IMG include a first color third data R3, a second color third data G3, a third color third data B3, a first color fourth data R4, a second color fourth data G4 and a third color fourth data B4, the display panel driver (e.g. the driving controller 200) may apply the data voltage corresponding to (R3+R4)/2 (i.e., average value of the first color third data R3 and the first color fourth data R4) to the first subpixel RY of the pixel having the first pixel structure, the data voltage corresponding to G3 (i.e., the second color third data G3) to the second subpixel GY of the pixel having the first pixel structure and the data voltage corresponding to (B3+B4)/2 (i.e., average value of the third color third data B3 and the third color fourth data B4) to the third subpixel BY of the pixel having the first pixel structure. Herein, the second color fourth data G4 (i.e., the second color fourth data G4) of the input image data IMG may not be displayed on the display panel 100.

According to the present embodiment, the pixel structure of the pixel in the first display area DA including at least a portion overlapping with the optical module CM is different from the pixel structure of the pixel in the second display area DB not overlapping with the optical module CM such that the display quality of the display panel 100 may be enhanced. In addition, the first to third subpixels of the one pixel of the first display area DA may be connected to the first to third subpixels of the one pixel of the second display area DB, respectively, such that a data distortion and a data mixing may be prevented in the first display area DA.

Figure 7:
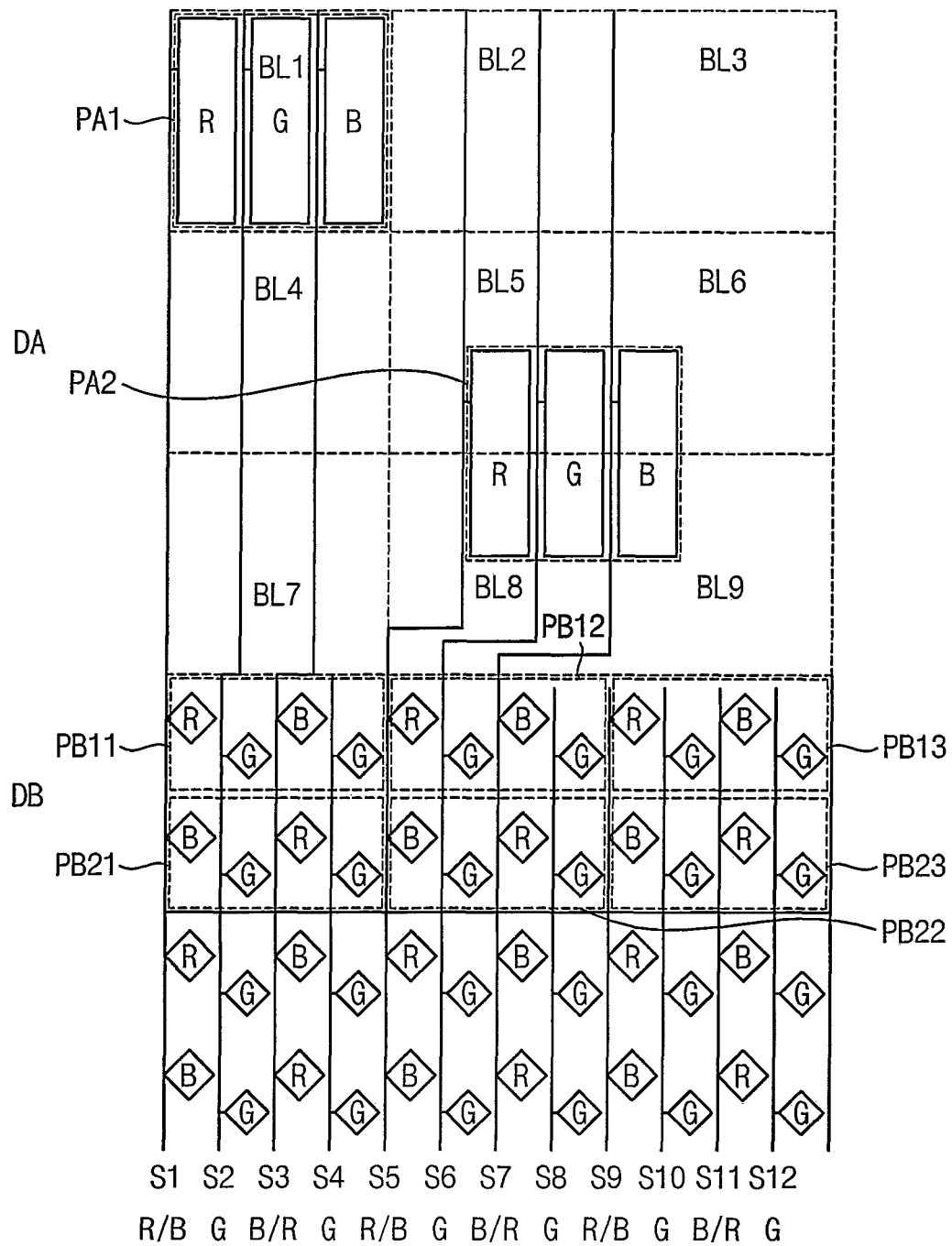
FIG. 7 is a conceptual diagram illustrating a pixel structure of a first display area and a pixel structure of a second display area of a display panel of a display apparatus according to an embodiment of the present inventive concept.

FIG. 7 is a conceptual diagram illustrating a pixel structure of a first display area and a pixel structure of a second display area of a display panel of a display apparatus according to an embodiment of the present inventive concept.

The display apparatus and the method of driving the display apparatus according to the present embodiment is substantially the same as the display apparatus and the method of driving the display apparatus of the previous embodiment explained referring to FIGS. 1 to 6 except for the connection structure of the pixel in the first display area and the pixel in the second display area. Thus, the same reference numerals will be used to refer to the same or like parts as those described in the previous embodiment of FIGS. 1 to 6 and any repetitive explanation concerning the above elements will be omitted.

Referring to FIGS. 1 to 4, 6 and 7, the display apparatus includes a display panel 100 and a display panel driver. The display panel driver includes a driving controller 200, a gate driver 300, a gamma reference voltage generator 400, a data driver 500 and an emission driver 600. The display apparatus may further include an optical module substrate 700.

The display panel 100 includes the first display area DA including at least a portion overlapping with the optical module CM and the second display area DB not overlapping with the optical module CM. The first display area DA includes pixels having a first pixel structure. The second display area DB includes pixels having a second pixel structure.

As shown in FIG. 7, each of the pixels PB11, PB12, PB13, PB21, PB22 and PB23 having the second pixel structure may include four subpixels. Each of the pixels PB11, PB12, PB13, PB21, PB22 and PB23 having the second pixel structure may include a first subpixel of a first color R, a second subpixel of a second color G, a third subpixel of a third color B and a fourth subpixel of the second color G.

The number of subpixels of each of the pixels PA1 and PA2 having the first pixel structure and disposed in the first display area DA may be different from the number of subpixels of each of the pixels PB11, PB12, PB13, PB21, PB22 and PB23 having the second pixel structure.

In an embodiment, for example, each of the pixels PA1 and PA2 having the first pixel structure may include three subpixels. Each of the pixels PA1 and PA2 having the first pixel structure may include a first subpixel of a first color R, a second subpixel of a second color G and a third subpixel of a third color B.

A shape of an emission area of the subpixel of the pixel PA1 and PA2 having the first pixel structure may be different from the shape of the emission area of the subpixel of the pixel (e.g. PB11, PB12, PB13, PB21, PB22 and PB23) having the second pixel structure.

In an embodiment, for example, each of the emission area of the first subpixel, the emission area of the second subpixel, the emission area of the third subpixel and the emission area of the fourth subpixel of the pixel (e.g. PB11, PB12, PB13, PB21, PB22 and PB23) having the second pixel structure may have a rhombus shape. For example, each of an emission area of the first subpixel, an emission area of the second subpixel and an emission area of the third subpixel of the pixel (e.g. PA1 and PA2) having the first pixel structure may have a rectangular shape.

As shown in FIG. 7, the size of the pixel (e.g. PA1 and PA2) having the first pixel structure may be greater than the size of the pixel (e.g. PB11, PB12, PB13, PB21, PB22 and PB23) having the second pixel structure. The size of the pixel (e.g. PA1 and PA2) having the first pixel structure may be about twice the size of the pixel (e.g. PB11, PB12, PB13, PB21, PB22 and PB23) having the second pixel structure. One pixel (e.g. PA1) having the first pixel structure may be disposed in one block (e.g., BL1). Two pixels (e.g. PB11 and PB21) having the second pixel structure may be disposed in one block having the same size with the one block (e.g., BL1) in the first display area DA.

The first subpixel of the first pixel structure and the first subpixel of the second pixel structure may be connected to the same data line. The second subpixel of the first pixel structure and the second subpixel of the second pixel structure may be connected to the same data line. The third subpixel of the first pixel structure and the third subpixel of the second pixel structure may be connected to the same data line.

In an embodiment, for example, a first data line S1 may be connected to a first subpixel of a first pixel PA1 having the first pixel structure and a first subpixel of a first pixel PB11 having the second pixel structure. For example, a second data line S2 may be connected to a second subpixel of a first pixel PA1 having the first pixel structure and a second subpixel of a first pixel PB11 having the second pixel structure. For example, a third data line S3 may be connected to a third subpixel of a first pixel PA1 having the first pixel structure and a third subpixel of a first pixel PB11 having the second pixel structure.

In contrast, a fourth data line S4 may be connected to a fourth subpixel of the first pixel PB11 having the second pixel structure but the fourth data line S4 may not be connected to any pixels having the first pixel structure.

In the present embodiment, the first to fourth subpixels of the first pixel PB11 having the second pixel structure may be connected to the first to fourth data lines S1 to S4, respectively. First to fourth subpixels of a second pixel PB12 having the second pixel structure and disposed adjacent to the first pixel PB11 in the first direction D1 may be connected to fifth to eighth data lines S5 to S8, respectively. First to fourth subpixels of a third pixel PB13 having the second pixel structure and disposed adjacent to the second pixel PB12 in the first direction D1 may be connected to ninth to twelfth data lines S9 to S12, respectively. In this structure, the first to third subpixels of the first pixel PA1 having the first pixel structure may be connected to the first to third data lines S1 to S3, respectively. First to third subpixels of the second pixel PA2 having the first pixel structure and disposed adjacent to the first pixel PA1 in a diagonal direction between the first direction D1 and the second direction D2 may be connected to the fifth to seventh data lines S5 to S7, respectively.

Although not shown in figures, the connection structure of the first pixel structure, the second structure and the data line may be repetitive in a horizontal direction. For example, first to fourth subpixels of a fourth pixel having the second pixel structure and disposed adjacent to the third pixel PB13 in the first direction D1 may be connected to thirteenth to sixteenth data lines, respectively. First to fourth subpixels of a fifth pixel having the second pixel structure and disposed adjacent to the fourth pixel in the first direction D1 may be connected to seventeenth to twentieth data lines, respectively. First to fourth subpixels of a sixth pixel having the second pixel structure and disposed adjacent to the fifth pixel in the first direction D1 may be connected to twenty first to twenty fourth data lines, respectively. In this structure, the first to third subpixels of a third pixel having the first pixel structure and disposed adjacent to the second pixel PA2 in a diagonal direction between the first direction D1 and the second direction D2 may be connected to the thirteenth to fifteenth data lines, respectively. First to third subpixels of a fourth pixel having the first pixel structure and disposed adjacent to the third pixel in a diagonal direction between the first direction D1 and the second direction D2 may be connected to the seventeenth to nineteenth data lines, respectively.

The first pixel PA1 in the first display area DA is connected to the first to third data lines S1 to S3 such that the first to third subpixels of the first pixel PA1 in the first display area DA are connected to the first to third subpixels of one pixel (e.g. PB11) in the second display area DB, respectively. Thus, the data distortion and the data mixing may be prevented in the first pixel PA1 in the first display area DA.

The second pixel PA2 in the first display area DA is connected to the fifth to seventh data lines S5 to S7 such that the first to third subpixels of the second pixel PA2 in the first display area DA are connected to the first to third subpixels of one pixel (e.g. PB12) in the second display area DB, respectively. Thus, the data distortion and the data mixing may be prevented in the second pixel PA2 in the first display area DA.

Unlike the above, if the second pixel PA2 in the first display area DA is connected to the seventh to ninth data lines S7 to S9, the first to third subpixels of the second pixel PA2 in the first display area DA are connected to subpixels of two pixels (e.g. a third subpixel R and a fourth subpixel G of PB22 and a first subpixel B of PB23) in the second display area DB. Thus, the second pixel PA2 in the first display area DA displays an image using partial data of two pixels (e.g. PB22 and PB23) such that the data distortion and the data mixing may be generated in the second pixel PA2 in the first display area DA. Therefore, a display defect may be generated at the first display area DA.

According to the present embodiment, the pixel structure of the pixel in the first display area DA including at least a portion overlapping with the optical module CM is different from the pixel structure of the pixel in the second display area DB not overlapping with the optical module CM such that the display quality of the display panel 100 may be enhanced. In addition, the first to third subpixels of the one pixel of the first display area DA may be connected to the first to third subpixels of the one pixel of the second display area DB, respectively, such that a data distortion and a data mixing may be prevented in the first display area DA.

Figure 8:
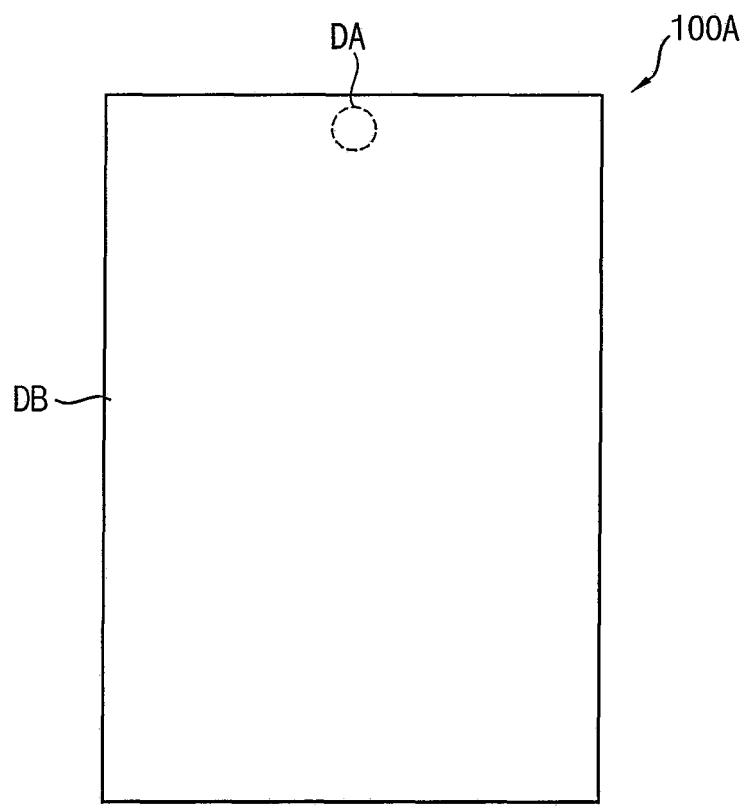
FIG. 8 is a conceptual diagram illustrating a display panel of a display apparatus according to an embodiment of the present inventive concept.

FIG. 8 is a conceptual diagram illustrating a display panel of a display apparatus according to an embodiment of the present inventive concept.

The display apparatus and the method of driving the display apparatus according to the present embodiment is substantially the same as the display apparatus and the method of driving the display apparatus of the previous embodiment explained referring to FIGS. 1 to 6 except for the shape of the first display area and the shape the second display area. Thus, the same reference numerals will be used to refer to the same or like parts as those described in the previous embodiment of FIGS. 1 to 6 and any repetitive explanation concerning the above elements will be omitted.

Referring to FIGS. 1, 3 to 6 and 8, the display apparatus includes a display panel 100A and a display panel driver. The display panel driver includes a driving controller 200, a gate driver 300, a gamma reference voltage generator 400, a data driver 500 and an emission driver 600. The display apparatus may further include an optical module substrate 700.

The display panel 100A may include a first display area DA and a second display area DB. The shape of the optical module substrate 700 in the present embodiment may be same as the shape of the optical module substrate 700 of FIG. 3. The optical module substrate 700 may include a first area CA and a second area CB.

The optical module substrate 700 may include an optical module CM. In the present embodiment, the optical module CM may be a camera module CM. The camera module CM may be disposed at a first end portion of the optical module substrate 700. The camera module CM may have a circular shape. The camera module CM may be disposed in the first area CA of the optical module substrate 700. The camera module CM may not be disposed in the second area CB of the optical module substrate 700. Although a size of the optical module substrate 700 is similar to a size of the display panel 100 in FIG. 3, the present inventive concept is not limited thereto. Alternatively, the optical module substrate 700 may be smaller than the display panel 100 such that the optical module substrate 700 may overlap with the first display area DA only.

In the present embodiment, the first display area DA of the display panel 100A may be formed at a first end portion corresponding to the first end portion of the optical module substrate 700. The first display area DA of the display panel 100A may cover the camera module CM. The first display area DA may have a circular shape.

In the present embodiment, the second display area DB may be defined as an area of the display panel 100A except for the first display area DA.

The first display area DA includes pixels having a first pixel structure and the second display area DB includes pixels having a second pixel structure.

As shown in FIG. 4, the first display area DA may include a plurality of pixel areas PA11, PA12, PA21, PA22, PA31, PA32, PA41 and PA42 and a plurality of transmitting areas TA11, TA12, TA21, TA22, TA31, TA32, TA41 and TA42.

As shown in FIG. 5, each of the pixels PB11, PB12, PB13, PB21, PB22 and PB23 having the second pixel structure may include four subpixels. Each of the pixels PB11, PB12, PB13, PB21, PB22 and PB23 having the second pixel structure may include a first subpixel of a first color R, a second subpixel of a second color G, a third subpixel of a third color B and a fourth subpixel of the second color G.

The number of subpixels of each of the pixels PA1 and PA2 having the first pixel structure and disposed in the first display area DA may be different from the number of subpixels of each of the pixels PB11, PB12, PB13, PB21, PB22 and PB23 having the second pixel structure.

For example, each of the pixels PA1 and PA2 having the first pixel structure may include three subpixels. Each of the pixels PA1 and PA2 having the first pixel structure may include a first subpixel of a first color R, a second subpixel of a second color G and a third subpixel of a third color B.

A shape of an emission area of the subpixel of the pixel PA1 and PA2 having the first pixel structure may be different from the shape of the emission area of the subpixel of the pixel (e.g. PB11, PB12, PB13, PB21, PB22 and PB23) having the second pixel structure.

In an embodiment, for example, each of the emission area of the first subpixel, the emission area of the second subpixel, the emission area of the third subpixel and the emission area of the fourth subpixel of the pixel (e.g. PB11, PB12, PB13, PB21, PB22 and PB23) having the second pixel structure may have a rhombus shape. For example, each of an emission area of the first subpixel, an emission area of the second subpixel and an emission area of the third subpixel of the pixel (e.g. PA1 and PA2) having the first pixel structure may have a rectangular shape.

The first subpixel of the first pixel structure and the first subpixel of the second pixel structure may be connected to the same data line. The second subpixel of the first pixel structure and the second subpixel of the second pixel structure may be connected to a\the same data line. The third subpixel of the first pixel structure and the third subpixel of the second pixel structure may be connected to the same data line.

In the present embodiment, the connection structure of the pixel in the first display area DA and the pixel in the second display area DB may be same as the connection structure of FIG. 5 or the connection structure of FIG. 7.

According to the present embodiment, the pixel structure of the pixel in the first display area DA including at least a portion overlapping with the optical module CM is different from the pixel structure of the pixel in the second display area DB not overlapping with the optical module CM such that the display quality of the display panel 100A may be enhanced. In addition, the first to third subpixels of the one pixel of the first display area DA may be connected to the first to third subpixels of the one pixel of the second display area DB, respectively, such that a data distortion and a data mixing may be prevented in the first display area DA.

Figure 9:
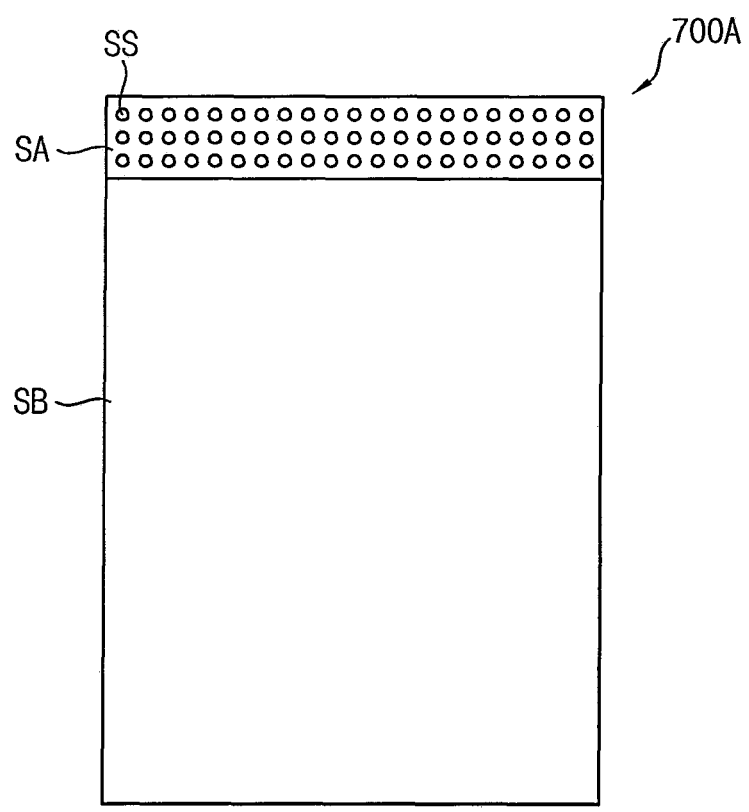
FIG. 9 is a conceptual diagram illustrating an optical module substrate of a display apparatus according to an embodiment of the present inventive concept.

FIG. 9 is a conceptual diagram illustrating an optical module substrate of a display apparatus according to an embodiment of the present inventive concept.

The display apparatus and the method of driving the display apparatus according to the present embodiment is substantially the same as the display apparatus and the method of driving the display apparatus of the previous embodiment explained referring to FIGS. 1 to 6 except for the structure of the optical module substrate. Thus, the same reference numerals will be used to refer to the same or like parts as those described in the previous embodiment of FIGS. 1 to 6 and any repetitive explanation concerning the above elements will be omitted.

Referring to FIGS. 1, 2, 4 to 6 and 9, the display apparatus includes a display panel 100 and a display panel driver. The display panel driver includes a driving controller 200, a gate driver 300, a gamma reference voltage generator 400, a data driver 500 and an emission driver 600. The display apparatus may further include an optical module substrate 700A.

The display panel 100 may include a first display area DA and a second display area DB. The shape of the display panel 100 in the present embodiment may be same as the shape of the display panel 100 of FIG. 2. In the present embodiment, the optical module substrate 700A may include a first area SA and a second area SB.

The optical module substrate 700A may include an optical module. In the present embodiment, the optical module may include a plurality of sensors SS sensing a user. For example, the optical module may include proximity sensors to sense a proximity of the user. For example, the optical module may include gesture sensors to sense a gesture of the user. For example, the optical module may include fingerprint sensors to sense a fingerprint of the user. For example, the optical module may include iris recognition sensors to sense an iris of the user. For example, the optical module may include face recognition sensors to sense a face of the user.

The sensors SS may be disposed in the first area SA of the optical module substrate 700A. Although the sensors forming a three by twenty-one matrix are disposed in the first area SA is illustrated in FIG. 9, the present inventive concept is not limited to the number of the sensors SS. In addition, unlike FIG. 9, sensors in a first row and sensors in a second row may be disposed to be staggered.

In an embodiment, for example, the optical module may include a plurality of face recognition sensors SS disposed at a first end portion of the optical module substrate 700A. The face recognition sensors SS may have a circular shape. The first display area DA of the display panel 100 may be formed at a first end portion corresponding to the first end portion of the optical module substrate 700A. The first display area DA of the display panel 100 may cover the plurality of the face recognition sensors SS. The first display area DA may have a rectangular shape.

The first display area DA includes pixels having a first pixel structure and the second display area DB includes pixels having a second pixel structure.

As shown in FIG. 4, the first display area DA may include a plurality of pixel areas PA11, PA12, PA21, PA22, PA31, PA32, PA41 and PA42 and a plurality of transmitting areas TA11, TA12, TA21, TA22, TA31, TA32, TA41 and TA42.

As shown in FIG. 5, each of the pixels PB11, PB12, PB13, PB21, PB22 and PB23 having the second pixel structure may include four subpixels. Each of the pixels PB11, PB12, PB13, PB21, PB22 and PB23 having the second pixel structure may include a first subpixel of a first color R, a second subpixel of a second color G, a third subpixel of a third color B and a fourth subpixel of the second color G.

The number of subpixels of each of the pixels PA1 and PA2 having the first pixel structure and disposed in the first display area DA may be different from the number of subpixels of each of the pixels PB11, PB12, PB13, PB21, PB22 and PB23 having the second pixel structure.

In an embodiment, for example, each of the pixels PA1 and PA2 having the first pixel structure may include three subpixels. Each of the pixels PA1 and PA2 having the first pixel structure may include a first subpixel of a first color R, a second subpixel of a second color G and a third subpixel of a third color B.

A shape of an emission area of the subpixel of the pixel PA1 and PA2 having the first pixel structure may be different from the shape of the emission area of the subpixel of the pixel (e.g. PB11, PB12, PB13, PB21, PB22 and PB23) having the second pixel structure.

In an embodiment, for example, each of the emission area of the first subpixel, the emission area of the second subpixel, the emission area of the third subpixel and the emission area of the fourth subpixel of the pixel (e.g. PB11, PB12, PB13, PB21, PB22 and PB23) having the second pixel structure may have a rhombus shape. For example, each of an emission area of the first subpixel, an emission area of the second subpixel and an emission area of the third subpixel of the pixel (e.g. PA1 and PA2) having the first pixel structure may have a rectangular shape.

The first subpixel of the first pixel structure and the first subpixel of the second pixel structure may be connected to the same data line. The second subpixel of the first pixel structure and the second subpixel of the second pixel structure may be connected to the same data line. The third subpixel of the first pixel structure and the third subpixel of the second pixel structure may be connected to the same data line.

In the present embodiment, the connection structure of the pixel in the first display area DA and the pixel in the second display area DB may be same as the connection structure of FIG. 5 or the connection structure of FIG. 7.

According to the present embodiment, the pixel structure of the pixel in the first display area DA including at least a portion overlapping with the optical module CM is different from the pixel structure of the pixel in the second display area DB not overlapping with the optical module CM such that the display quality of the display panel 100 may be enhanced. In addition, the first to third subpixels of the one pixel of the first display area DA may be connected to the first to third subpixels of the one pixel of the second display area DB, respectively, such that a data distortion and a data mixing may be prevented in the first display area DA.

According to the present inventive concept as explained above, the display quality of the display panel of the display apparatus including the optical module may be enhanced.

The foregoing is illustrative of the present inventive concept and is not to be construed as limiting thereof. Although a few embodiments of the present inventive concept have been described, those skilled in the art will readily appreciate that many modifications are possible in the embodiments without materially departing from the novel teachings and advantages of the present inventive concept. Accordingly, all such modifications are intended to be included within the scope of the present inventive concept as defined in the claims. In the claims, means-plus-function clauses are intended to cover the structures described herein as performing the recited function and not only structural equivalents but also equivalent structures. Therefore, it is to be understood that the foregoing is illustrative of the present inventive concept and is not to be construed as limited to the specific embodiments disclosed, and that modifications to the disclosed embodiments, as well as other embodiments, are intended to be included within the scope of the appended claims. The present inventive concept is defined by the following claims, with equivalents of the claims to be included therein.

What is claimed is:

1. A display apparatus comprising: an optical module; a display panel disposed on the optical module; and a display panel driver which drives the display panel, wherein the display panel includes a first display area including at least a portion overlapping with the optical module and a second display area not overlapping with the optical module in a plan view, wherein the first display area includes pixels having a first pixel structure, wherein the second display area includes pixels having a second pixel structure different from the first pixel structure, and wherein a ratio between a total number of subpixels in a unit area of the first pixel structure and a total number of the subpixels in a unit area of the second pixel structure is 1:12, and the unit area of the first pixel structure and the unit area of the second pixel structure have a same size.

2. The display apparatus of claim 1, wherein the pixel having the second pixel structure comprises a first subpixel of a first color, a second subpixel of a second color, a third subpixel of a third color and a fourth subpixel of the second color.

3. The display apparatus of claim 2, wherein each of an emission area of the first subpixel, an emission area of the second subpixel, an emission area of the third subpixel and an emission area of the fourth subpixel of the pixel having the second pixel structure has a rhombus shape.

4. The display apparatus of claim 3, wherein each of the emission area of the first subpixel and the emission area of the third subpixel of the pixel having the second pixel structure are greater than each of the emission area of the second subpixel and the emission area of the fourth subpixel of the pixel having the second pixel structure.

5. The display apparatus of claim 2, wherein the pixel having the first pixel structure comprises a first subpixel of the first color, a second subpixel of the second color and a third subpixel of the third color.

6. The display apparatus of claim 5, wherein each of an emission area of the first subpixel, an emission area of the second subpixel, an emission area of the third subpixel and an emission area of the fourth subpixel of the pixel having the second pixel structure has a rhombus shape, and
wherein each of an emission area of the first subpixel, an emission area of the second subpixel and an emission area of the third subpixel of the pixel having the first pixel structure has a rectangular shape.

7. The display apparatus of claim 5, wherein the first subpixel of the first pixel structure and the first subpixel of the second pixel structure are connected to a same data line,
wherein the second subpixel of the first pixel structure and the second subpixel of the second pixel structure are connected to a same data line, and
wherein the third subpixel of the first pixel structure and the third subpixel of the second pixel structure are connected to a same data line.

8. The display apparatus of claim 5, wherein first to fourth subpixels of a first pixel having the second pixel structure are connected to first to fourth data lines, respectively, first to fourth subpixels of a second pixel having the second pixel structure and disposed adjacent to the first pixel having the second pixel structure are connected to fifth to eighth data lines, respectively, and first to fourth subpixels of a third pixel having the second pixel structure and disposed adjacent to the second pixel having the second pixel structure are connected to ninth to twelfth data lines, respectively, and
wherein first to third subpixels of a first pixel having the first pixel structure are connected to the first to third data lines, respectively, and first to third subpixels of a second pixel having the first pixel structure and disposed adjacent to the first pixel having the first pixel structure are connected to the nine to eleventh data lines, respectively.

9. The display apparatus of claim 5, wherein first to fourth subpixels of a first pixel having the second pixel structure are connected to first to fourth data lines, respectively, first to fourth subpixels of a second pixel having the second pixel structure and disposed adjacent to the first pixel having the second pixel structure are connected to fifth to eighth data lines, respectively, and first to fourth subpixels of a third pixel having the second pixel structure and disposed adjacent to the second pixel having the second pixel structure are connected to ninth to twelfth data lines, respectively, and
wherein first to third subpixels of a first pixel having the first pixel structure are connected to the first to third data lines, respectively, and first to third subpixels of a second pixel having the first pixel structure and disposed adjacent to the first pixel having the first pixel structure are connected to the fifth to seventh data lines, respectively.

10. The display apparatus of claim 5, wherein when input image data comprise a first color first data, a second color first data, a third color first data, a first color second data, a second color second data and a third color second data, the display panel driver is configured to apply a data voltage corresponding to an average value of the first color first data and the first color second data to the first subpixel of the pixel having the second pixel structure, a data voltage corresponding to a value of the second color first data to the second subpixel of the pixel having the second pixel structure, a data voltage corresponding to an average value of the third color first data and the third color second data to the third subpixel of the pixel having the second pixel structure and a data voltage corresponding to a value of the second color second data to the fourth subpixel of the pixel having the second pixel structure.

11. The display apparatus of claim 10, wherein when the input image data comprise a first color third data, a second color third data, a third color third data, a first color fourth data, a second color fourth data and a third color fourth data, the display panel driver is configured to apply a data voltage corresponding to an average value of the first color third data and the first color fourth data to the first subpixel of the pixel having the first pixel structure, a data voltage corresponding to a value of the second color third data to the second subpixel of the pixel having the first pixel structure and a data voltage corresponding to an average value of the third color third data and the third color fourth data to the third subpixel of the pixel having the first pixel structure.

12. The display apparatus of claim 5, wherein a ratio between a total number of subpixels of the second color in the unit area of the first pixel structure and a total number of subpixels of the second color in the unit area of the second pixel structure is 1:18.

13. The display apparatus of claim 1, wherein the optical module is a camera module.

14. The display apparatus of claim 13, wherein the camera module is disposed at a first end portion of an optical module substrate,
   wherein the camera module has a circular shape,
   wherein the first display area is disposed at a first end portion of the display panel corresponding to the first end portion of the optical module substrate,
   wherein the first display area covers the camera module in the plan view, and
   wherein the first display area has a rectangular shape.

15. The display apparatus of claim 13, wherein the camera module is disposed at a first end portion of an optical module substrate,
   wherein the camera module has a circular shape,
   wherein the first display area is disposed at a first end portion of the display panel corresponding to the first end portion of the optical module substrate,
   wherein the first display area covers the camera module in the plan view, and
   wherein the first display area has a circular shape.

16. The display apparatus of claim 1, wherein the optical module includes a face recognition sensor module,
   wherein the face recognition sensor module comprises a plurality of face recognition sensors disposed at a first end portion of an optical module substrate,
   wherein the face recognition sensor has a circular shape,
   wherein the first display area of the display panel is disposed at a first end portion of the display panel corresponding to the first end portion of the optical module substrate,
   wherein the first display area of the display panel covers the plurality of the face recognition sensors in the plan view, and
   wherein the first display area has a rectangular shape.

17. A method of driving a display apparatus, the method comprising: driving a first display area including at least a portion overlapping with an optical module in a plan view, wherein the first display area includes pixels having a first pixel structure; and driving a second display area not overlapping with the optical module in the plan view, wherein the second display area includes pixels having a second pixel structure different from the first pixel structure, wherein the pixel having the second pixel structure comprises a first subpixel of a first color, a second subpixel of a second color, a third subpixel of a third color and a fourth subpixel of the second color, wherein the pixel having the first pixel structure comprises a first subpixel of the first color, a second subpixel of the second color and a third subpixel of the third color, and wherein a ratio between a total number of the first subpixels in a unit area of the first pixel structure and a total number of the first subpixels in a unit area of the second pixel structure is 1:9, and the unit area of the first pixel structure and the unit area of the second pixel structure have a same size.

18. The method of claim 17, wherein first to fourth subpixels of a first pixel having the second pixel structure are connected to first to fourth data lines, respectively, first to fourth subpixels of a second pixel having the second pixel structure and disposed adjacent to the first pixel having the second pixel structure are connected to fifth to eighth data lines, respectively, and first to fourth subpixels of a third pixel having the second pixel structure and disposed adjacent to the second pixel having the second pixel structure are connected to ninth to twelfth data lines, respectively, and
   wherein first to third subpixels of a first pixel having the first pixel structure are connected to the first to third data lines, respectively, and first to third subpixels of a second pixel having the first pixel structure and disposed adjacent to the first pixel having the first pixel structure are connected to the nine to eleventh data lines, respectively.

19. The method of claim 17, wherein first to fourth subpixels of a first pixel having the second pixel structure are connected to first to fourth data lines, respectively, first to fourth subpixels of a second pixel having the second pixel structure and disposed adjacent to the first pixel having the second pixel structure are connected to fifth to eighth data lines, respectively, and first to fourth subpixels of a third pixel having the second pixel structure and disposed adjacent to the second pixel having the second pixel structure are connected to ninth to twelfth data lines, respectively, and
   wherein first to third subpixels of a first pixel having the first pixel structure are connected to the first to third data lines, respectively, and first to third subpixels of a second pixel having the first pixel structure and disposed adjacent to the first pixel having the first pixel structure are connected to the fifth to seventh data lines, respectively.

20. The method of claim 17, wherein when input image data comprise a first color first data, a second color first data, a third color first data, a first color second data, a second color second data and a third color second data, a display panel driver is configured to apply a data voltage corresponding to an average value of the first color first data and the first color second data to the first subpixel of the pixel having the second pixel structure, a data voltage corresponding to a value of the second color first data to the second subpixel of the pixel having the second pixel structure, a data voltage corresponding to an average value of the third color first data and the third color second data to the third subpixel of the pixel having the second pixel structure and a data voltage corresponding to a value of the second color second data to the fourth subpixel of the pixel having the second pixel structure.

21. The method of claim 20, wherein when the input image data comprise a first color third data, a second color third data, a third color third data, a first color fourth data, a second color fourth data and a third color fourth data, the display panel driver is configured to apply a data voltage corresponding to an average value of the first color third data and the first color fourth data to the first subpixel of the pixel having the first pixel structure, a data voltage corresponding to a value of the second color third data to the second subpixel of the pixel having the first pixel structure and a data voltage corresponding to an average value of the third color third data and the third color fourth data to the third subpixel of the pixel having the first pixel structure.

\* \* \* \* \*